Figure 1:
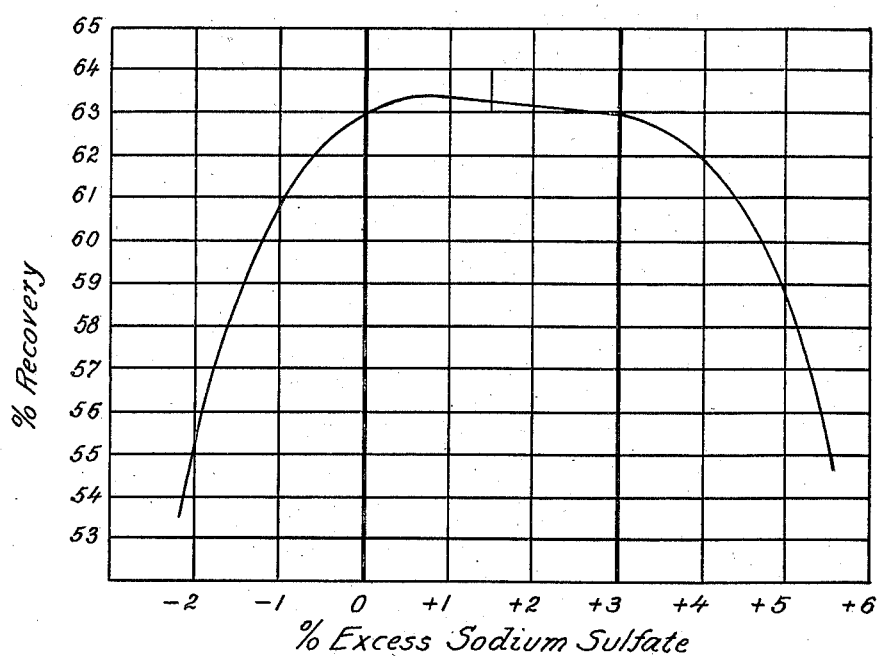

Feb. 6, 1940.     R. S. PARK     2,189,179

PROCESS FOR MAKING SODIUM ALUMINUM SULPHATE

Filed July 15, 1938

INVENTOR
Ralph S. Park
BY
ATTORNEY

Patented Feb. 6, 1940

2,189,179

UNITED STATES PATENT OFFICE 2,189,179

PROCESS FOR MAKING SODIUM ALUMINUM SULPHATE

Ralph S. Park, Queens Village, N. Y., assignor to General Chemical Company, New York, N. Y., a corporation of New York Application July 15, 1938, Serial No. 219,337

5 Claims. (Cl. 23—118)

This invention is concerned with the manufacture of sodium aluminum sulphate.

In the past commercial sodium aluminum sulphate products have been prepared by making up a solution of the mixed salt and then evaporating to dryness. Since a slight excess of aluminum sulphate was desired to provide a product of required acidity, the solution was made up with these proportions. The product of this method of preparation was usually contaminated with iron derived from the bauxite used in preparing the solution and had an objectionable bitter taste.

The manufacture of sodium aluminum sulphate of high purity and of good crystal form presents considerable difficulties. Specifically, two of the greatest difficulties have been as follows: (1) the product is generally contaminated with iron derived from the raw materials; (2) the product may be obtained in the form of a plastic magma which adsorbs considerable amounts of impurities and is difficult to wash and otherwise handle. To avoid these difficulties, it has been proposed to crystallize from relatively dilute solutions, but by this method low crystal yields were obtained, and it was necessary to combine sodium aluminum sulphate manufacture with another process such as water purification or manufacture of potassium aluminum sulphate in order to utilize the valuable constituents retained by the mother liquor.

Hence, although the cost of raw materials for manufacture of sodium aluminum sulphate is less than for manufacture of potassium aluminum sulphate, nevertheless, the latter has been preferred in industry because of its greater ease of production and higher purity.

It is an object of this invention to overcome the difficulties that lie in the way of the commercial production and use of sodium aluminum sulphate.

More specifically, it is an object of this invention to prepare in high yields sodium aluminum sulphate which is both low in impurity, especially iron, and of good crystal quality.

In the process of the present invention I avoid formation of an objectionable magma by adding a concentrated sodium aluminum sulphate solution containing between 35% and 49% $Al_2(SO_4)_3.Na_2SO_4$ (having a density at boiling temperature above 38° Bé. but not above 50° Bé.) to a cool slurry, prepared in any suitable manner. I further improve the crystal form and purity of the product by maintaining in the slurry an excess of sodium sulphate over that theoretically required for forming hydrated

$Na_2SO_4.Al_2(SO_4)_3$, but not more than a 3% excess. By "slurry" I mean a mixture of an aqueous saturated sodium aluminum sulphate solution and hydrated crystals of sodium aluminum sulphate.

I may add a hot concentrated solution of sodium aluminum sulphate containing an excess of sodium sulphate to the slurry of sodium aluminum sulphate, in which event the excess of sodium sulphate is supplied by the added sodium aluminum sulphate solution, or I may add the excess of sodium sulphate separately. The important consideration is to maintain an excess but not greater than 3% excess in the solution from which the sodium aluminum sulphate is crystallizing during the major part of the crystallizing period, and preferably throughout substantially the entire period.

Figure 2:
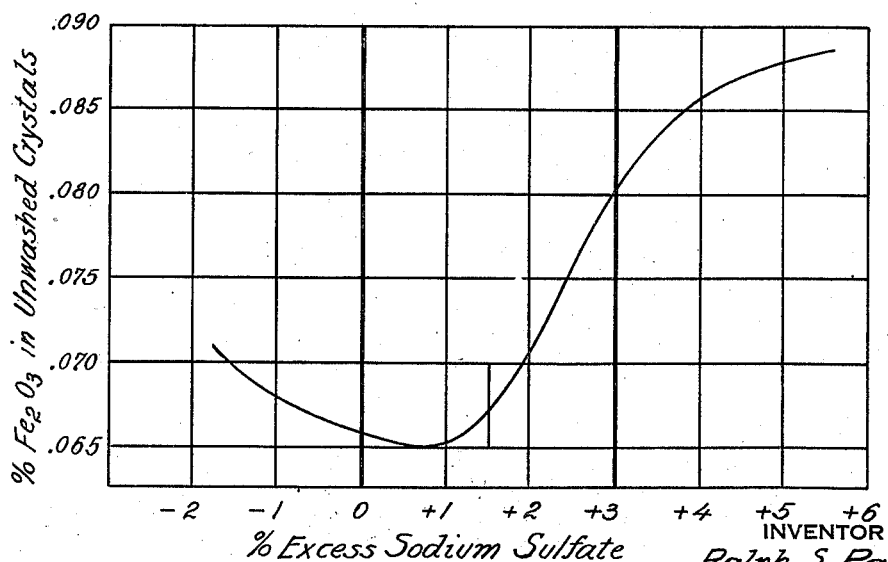

The advantage of employing an excess of sodium sulphate within the stated range is evident from a consideration of the accompanying drawing wherein Fig. 1 shows the effect of excess sodium sulphate on yield of sodium aluminum sulphate obtained in one crystallization and Fig. 2 shows the effect of the excess of sodium sulphate on the iron content of the product.

As shown by Fig. 1 provision of a positive excess not exceeding 3% of sodium sulphate results in high yields of the product whereas if an excess is not employed or if too great an excess is employed the yields are substantially less and decrease rapidly as the sodium sulphate content is varied from the preferred concentrations. As shown in Fig. 2, the iron content of the product is near a minimum within the range of sodium sulphate concentrations specified above. Since iron is the main and most objectionable impurity, and, furthermore, is a measure of total impurity, it is evident that the curve in Fig. 2 indicates the most favorable range of sodium sulphate concentrations from the standpoint of purity of product. This range, which is the preferred range of my process, corresponds to an excess up to about 1.5% over the stoichiometric amount. A further advantage paralleling that of crystal purity is quality of the crystals. I have found that the same range of sodium sulphate concentrations most favorable to crystal purity also causes production of the largest and best formed crystals.

The process may be carried out by adding gradually a concentrated sodium aluminum sulphate solution containing between 35% and 49% $Al_2(SO_4)_3 \cdot Na_2SO_4$ and between 0% and 3% excess $Na_2SO_4$ to a slurry (prepared, for example, by concentrating a similar solution to about 33½% sodium aluminum sulphate and cooling rapidly) maintained at a temperature below 40° C. The rate of addition of the hot solution to the cool slurry depends upon the effectiveness of cooling and should not be sufficiently rapid to cause the temperature of the slurry to rise above 30° C. for any substantial part of the crystallization period. Otherwise the product has a great tendency to crystallize quickly in the form of a pasty magma. A similar effect may be produced if the specified maximum concentration of sodium aluminum sulphate is exceeded.

The added sodium aluminum sulphate is crystallized rapidly by the above procedure and the crystalline product may be separated from mother liquor in any suitable manner as by draining or centrifuging. The crystals, because of their good crystalline form, separate unusually rapidly and completely from the mother liquor and therefore retain comparatively little of the liquor adhering to the surface. The excess sodium sulphate further reduces the viscosity of the mother liquor and makes separation still more effective. The resulting mother liquor, which because of the removal of sodium aluminum sulphate therefrom now contains a substantially greater excess of sodium sulphate than previously, may have the sodium sulphate content corrected by the addition of aluminum sulphate and may be concentrated to a content between 35% and 49% $Al_2(SO_4)_3 \cdot Na_2SO_4$ and subjected to crystallization in the same manner as the original solution.

Since the iron content of the solution increases with each successive concentration, it will be higher in the second mother liquor than in the first and the iron content of the products obtained from successive crystallizations will gradually increase as a result of this higher concentration of iron in the adhering mother liquor. Accordingly, the number of recrystallizations that it is desired to employ will depend upon the initial iron content of the materials employed and the allowable iron content of the product being produced. If the initial materials employed contain other impurities that are objectionable, this limitation applies to such impurities as well as iron.

By operating in the prescribed manner, employing a series of crystallizations to recover in the neighborhood of 75% of the sodium aluminum sulphate in the solution in each crystallization, I may obtain over-all yields in the neighborhood of 95% with a much higher purity of product than obtainable from the same initial materials by a single crystallization. Moreover, since only a small fraction of the crystal product initially contains a relatively high impurity content, only this small proportion need be washed with proportionately large quantities of wash water. This means that the process employs a minimum amount of wash water and, hence, involves a minimum of sodium aluminum sulphate wastage or reworking of wash solutions to recover their dissolved sodium aluminum sulphate content.

A specific example of how I may carry out my procedure is as follows: A solution containing 100.75 parts by weight of anhydrous sodium sulphate, 241 parts of aluminum sulphate, 1000 parts of water and 0.075% ±0.025% free alumina is made up from an Arkansas bauxite (containing 58% alumina and about 1.5% $Fe_2O_3$) and the required quantities of sulphuric acid and sodium sulphate. This corresponds to 0.75% excess sodium sulphate. This solution is boiled until its concentration is raised from its initial value of 25.5% to a final value of 33.5% sodium aluminum sulphate. 10% of this concentrated solution is withdrawn to a vessel provided with cooling coils and an agitator and is cooled rapidly with agitation to about 25° C. At this point about one-third of the double salt crystallizes out as granular crystals of the hydrate,

$Al_2(SO_4)_3 \cdot Na_2SO_4 \cdot 24H_2O$

The remaining 90% is further evaporated by boiling until its concentration of sodium aluminum sulphate reaches 46%. Without allowing this highly concentrated liquor to cool substantially below its boiling point, it is now added to the seed crop previously prepared. During this step the rate of addition and the control of cooling are such that the temperature of the slurry does not exceed 30° C.

Premature precipitation of sodium aluminum sulphate from the hot solution is likely to result in the formation of a magma and it is for this reason desirable that the hot solution be at a temperature above or at least not substantially below the temperature at which it is saturated with the sodium aluminum sulphate. By adding the hot solution to the cold slurry chilling is so rapid that practically no crystallization takes place above 30° C.

The resulting slurry of product crystals and mother liquor is cooled to between 20° and 25° C. and the crystals are separated and washed in a centrifuge. The unwashed crystals contain about 0.065% $Fe_2O_3$ and the yield is 63½%. By washing the crystals with a small quantity of wash water the iron content is reduced to 0.040% $Fe_2O_3$. By recrystallizing, using the same procedure, a product containing less than .01% $Fe_2O_3$ may be obtained. Sufficient aluminum sulphate is added to the mother liquor to reduce the sodium sulphate excess to about 0.75%. The resulting solution is concentrated to about 46% sodium aluminum sulphate and the hot concentrated solution is added to cold slurry as in the first step of the process. There is thus obtained a second crop of crystals which are separated from mother liquor by centrifuging and are washed to remove adhering mother liquor.

A third crop of crystals is obtained in the same way from the second mother liquor, and the three are combined to give a product of high purity. Finally, a fourth crop of crystals is obtained. This crop is too impure to mix with the previous crops but can be recrystallized in the manner above indicated to yield a pure product.

The over-all yield of washed crystals is 95%. Thus, the final mother liquor containing only 5% of the added salts may be wasted without serious economic loss.

To obtain anhydrous sodium aluminum sulphate for use in baking and for similar purposes, the product is calcined at about 530° C.

Before calcining, a small quantity of aluminum sulphate is added to provide a slight excess in the product and thus to provide the desired acidity of the final product. The aluminum sulphate may be added as such or in the form of a sodium aluminum sulphate containing an excess of the aluminum sulphate.

Although the above example is a preferred embodiment of my invention, I by no means limit myself to its exact details. The process may be operated either in batch or continuous fashion. The raw materials may be derived from a variety of sources and may be introduced into the system with or without previous purification, depending upon such factors as their content of impurities and commercial requirements. I do not limit myself to concentrating a single batch of solution, separating and cooling a portion, further concentrating the remaining portion, and mixing the two as described in the example; once a crop of crystals is available, a slurry may be made up and from then on there is no necessity for preparing the slurry as described in the example. In continuous operations the hot liquor may be added and the cold slurry may be removed continuously at such a rate that there is always present a more or less constant amount of the cold slurry in the crystallization vessel. In batch operations a part of each batch may be retained in the crystallizer to serve as initial slurry for the next.

I claim:

1. A process for obtaining crystalline sodium aluminum sulphate, which comprises adding a hot aqueous solution of sodium aluminum sulphate containing between 35% and 49%

$$Al_2(SO_4)_3.Na_2SO_4$$

to a cool aqueous slurry of sodium aluminum sulphate containing an excess, but not more than a 3% excess, of sodium sulhate, maintaining such excess throughout at least the major part of the crystallization period, and separating the resulting crystalline product from mother liquor.

2. A process for obtaining crystalline sodium aluminum sulphate of low iron content from an aluminum sulphate containing an excessive proportion of iron, which comprises preparing from the aluminum sulphate a hot aqueous solution of sodium aluminum sulphate containing between 35% and 49% $Al_2(SO_4)_3.Na_2SO_4$, adding the hot solution while at a temperature above the saturation temperature for the sodium aluminum sulphate to a cooled aqueous slurry of sodium aluminum sulphate containing an excess, but not more than a 3% excess, of sodium sulphate, maintaining such excess throughout at least a major part of the crystallization period, and correlating the rate of addition of hot solution and the cooling of the slurry so that the temperature of the latter does not rise above 30° C. for a substantial part of the crystallization period, and mechanically separating the resulting crystalline product from mother liquor.

3. A process for producing sodium aluminum sulphate, which comprises adding a hot aqueous solution of sodium aluminum sulphate containing between 35% and 49% $Al_2(SO_4)_3.Na_2SO_4$ to a cool slurry of sodium aluminum sulphate containing an excess, but not more than a 3% excess, of sodium sulphate, maintaining such excess throughout at least the major part of the crystallization period, separating the resulting crystals from mother liquor, adding aluminum sulphate to the crystalline product, and calcining the mixture to drive off water of crystallization.

4. A process for obtaining hydrated sodium aluminum sulphate, which comprises adding a hot aqueous solution of sodium aluminum sulphate containing between 35% and 49%

$$Al_2(SO_4)_3.Na_2SO_4$$

to a cool slurry of sodium aluminum sulphate containing an excess, but not more than a 3% excess, of sodium sulphate, maintaining such excess throughout at least the major part of the crystallization period, separating the crystalline product from mother liquor, adjusting the sodium sulphate excess in the mother liquor to not more than 3%, concentrating the mother liquor to between 35% and 49% $Al_2(SO_4)_3.Na_2SO_4$, adding the hot concentrated liquor to a cool aqueous slurry of sodium aluminum sulphate solution, maintaining the excess of sodium sulphate in the mixed liquor and slurry at not more than 3% during at least the major part of the crystallization period, separating the crystalline product from mother liquor, separately washing the crystalline products obtained in the first crystallization and the second crystallization, and mixing the washed products.

5. A process for obtaining a calcined sodium aluminum sulphate of low iron content from an aqueous sodium aluminum sulphate solution containing substantial quantities of iron, which comprises concentrating the sodium aluminum sulphate solution to about 46% $Al_2(SO_4)_3.Na_2SO_4$, providing an excess of about 0.75% sodium sulphate in the solution, adding the concentrated sodium aluminum sulphate solution at approximately its boiling point gradually to a cool sodium aluminum sulphate slurry containing about 0.75% excess sodium sulphate, correlating the rate of addition of the hot solution and cooling of the slurry so that the temperature of the latter does not exceed 30° C. for a substantial length of time, separating the resultant crystalline product from the cool slurry to provide one crop of crystals, repeating the process with the mother liquor to obtain a second crop of crystals, and with the resultant mother liquor to obtain a third crop of crystals, separately washing the three crystal crops to remove adhering mother liquor, mingling the three washed crystal crops, adding aluminum sulphate, and calcining the mixture to drive off water of crystallization.

RALPH S. PARK.